Sept. 23, 1952        H. E. NASH        2,611,460
DISCERPTIBLE STRUCTURE
Filed May 17, 1948        2 SHEETS—SHEET 1
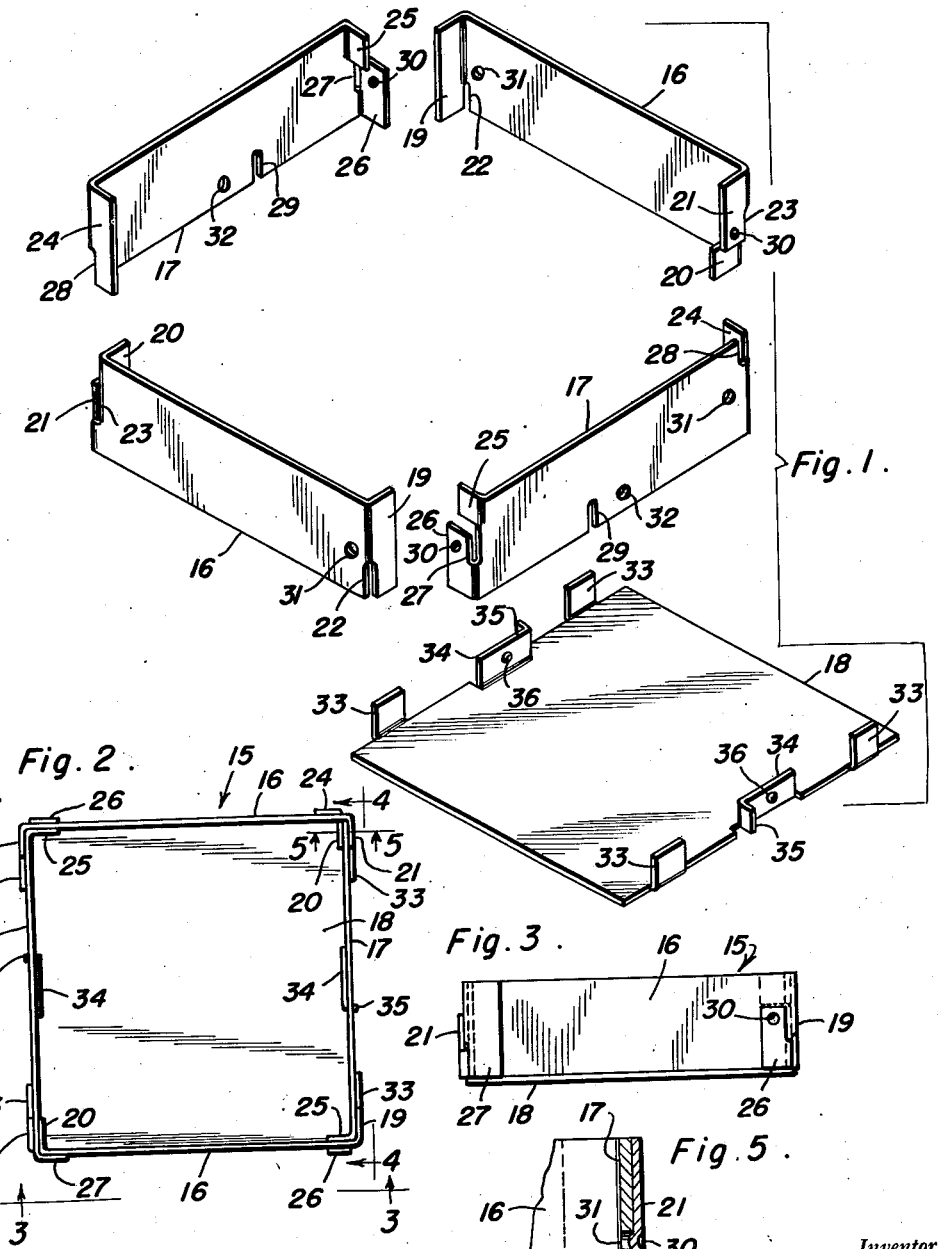
Inventor
Harold E. Nash Sept. 23, 1952          H. E. NASH          2,611,460
DISCERPTIBLE STRUCTURE
Filed May 17, 1948          2 SHEETS—SHEET 2
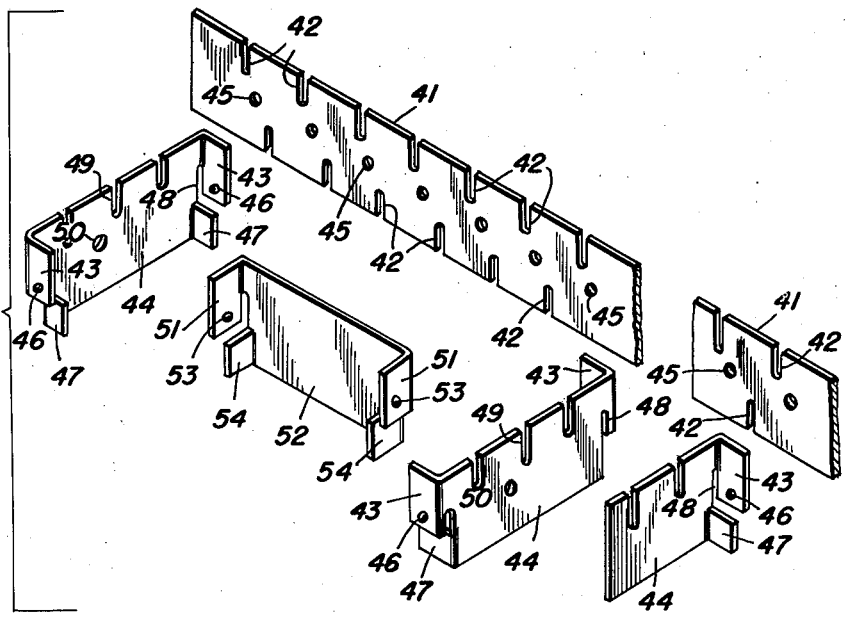
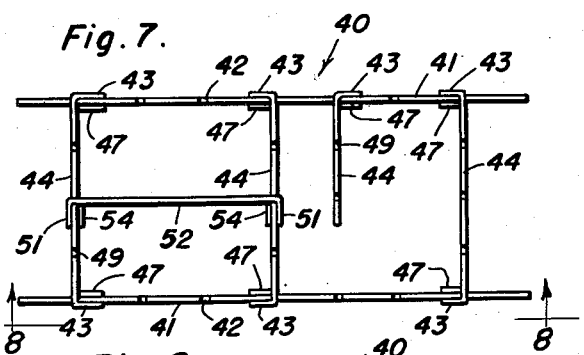
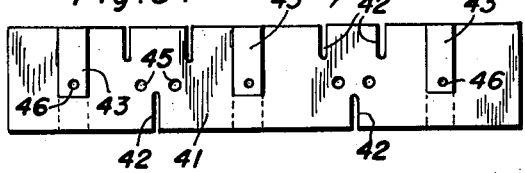
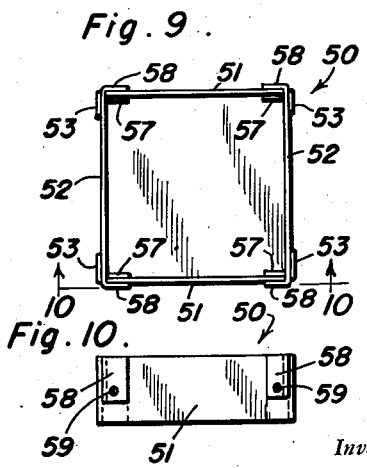
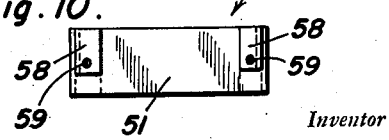
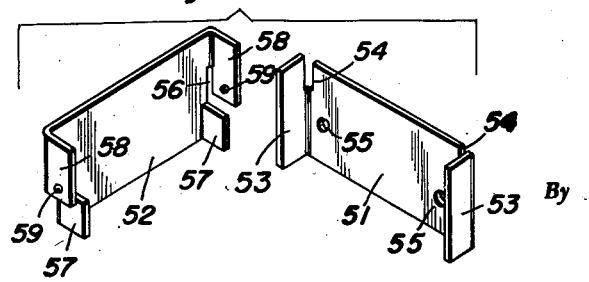
Inventor
Harold E. Nash
By *Clarence A. O'Brien and Harvey B. Jackson*
                       Attorneys Patented Sept. 23, 1952

2,611,460

UNITED STATES PATENT OFFICE 2,611,460

DISCERPTIBLE STRUCTURE

Harold E. Nash, St. Louis, Mo.

Application May 17, 1948, Serial No. 27,530

1 Claim. (Cl. 189—36)

This invention relates to new and useful improvements and structural refinements in structures such as display racks, benches, shelves, cabinets, boxes, or the like, and the principal object of the invention is to provide a discerptible structure of the character herein described which is composed of a plurality of selectively combined, interlocking members and which, by virtue of this construction, may be readily erected, dismantled, or rearranged in accordance with the particular requirements of the purpose for which it is intended.

A further object of the invention is to provide a discerptible structure which, although being readily assembled or dismantled as aforesaid, is of an exceptionally rigid and sturdy nature.

Another object of the invention is to provide a discerptible structure which is simple, pleasing in appearance and which readily lends itself to economical manufacture.

With the above more important objects in view, and such other objects as may become apparent as this specification proceeds, the invention consists essentially of the arrangement and construction of parts as illustrated in the accompanying drawings, in which:

Figure 1 is an exploded perspective view showing a plurality of the structural members in readiness for assembly;

Figure 2 is a top plan view of the assembled structure;

Figure 3 is a side elevational view, taken in the plane of the line 3—3 of Figure 2;

Figure 4 is a side elevational view, taken in the plane of the line 4—4 in Figure 2;

Figure 5 is a cross sectional view, taken substantially in the plane of the line 5—5 in Figure 2;

Figure 6 is an exploded perspective view showing a plurality of structural components in readiness for the assembly of a modified structural form;

Figure 7 is a top plan view of a structure embodying the components shown in Figure 6;

Figure 8 is an elevational view, taken in the plane of the line 8—8 in Figure 7;

Figure 9 is a top plan view of a further modified structure;

Figure 10 is an elevational view, taken in the plane of the line 10—10 in Figure 9, and Figure 11 is an exploded perspective view showing a pair of structural members used in the subject shown in Figures 9 and 10.

Like characters of reference are used to designate like parts in the specification and throughout the several views.

Referring now to the accompanying drawings in detail, more particularly to Figures 1 to 5 inclusively, the invention consists of a discerptible structure designated generally by the reference character 15, the same embodying in its construction a plurality of interlocking members 16, 17 and 18.

For purposes of illustration, the structure 15 assumes the form of a simple box, the bottom thereof consisting of the panel-like member 18 while the strip-like members 16 and 17 constitute the upstanding sides.

The essence of the invention resides in the provision of the locked joints whereby the members 16, 17 and 18 are connected or interlocked together, these locked joints being presently described.

The members 16, 17, 18 are similar in construction and the description of one will suffice for both. The member is provided at the ends thereof with a transversely extending portion 19 and a lateral projection 20, the latter being relatively small with respect to the former and being disposed adjacent a flange-like tongue 21. It will be noted that the tongue 21 is laterally offset with respect to the projection 20 and that the portion 19 and the projection 20 are provided in the corners thereof, as it were, with open slots 22, 23 respectively.

The members 17 are of a similar configuration, each including the transverse portions and flanges 24, 25, the tongue 26 and a pair of slots 27 and 28.

The members 17 are also provided medially of their length with an open slot 29, the purpose thereof being hereinafter more fully explained.

The locked joint between each end of the members 16 and the adjacent end of the members 17 is formed by simply engaging the slots 22 with the slots 27 and the slots 23 with the slots 28, whereupon it will be noted that the tongue 21 and the projection 20 will be disposed adjacent the relatively opposite sides of the member 17, while the tongue 26 and the flange 25 will be similarly disposed adjacent the relatively opposite sides of members 16. Furthermore, the portions 19 and 24 will be disposed adjacent the outer surfaces of the members 17 and 16 respectively, whereby the wall structure will be rigidly yet separably interlocked.

The structure is releasably retained in this interlocked position by providing the tongues 21 and 26 with suitable indentations constituting the detents 30, these being releasably engageable with suitable apertures 31 provided in the members 16 and 17.

It will be noted that the members 17 are also provided with further apertures 32, these being disposed adjacent the slots 29 and the purpose thereof being hereinafter more fully explained.

The aforementioned bottom member 18 is formed with a plurality of upstanding flanges 33 and with a pair of further flanges 34 carrying the outturned tongues 35.

The flanges 34 are equipped with suitable indentations constituting the detents 36 and when the member 18 is assembled to the members 16 and 17, the tongues 35 are received in the slots 29, while the detents 36 engage the apertures 32. At the same time, the flanges 33 are disposed adjacent the outer surfaces of the members 17 and supportably engage the same.

It will be noted from the foregoing that the invention resides primarily in the discerptible structure resulting from the interlocked arrangement or combination of the individual members, in other words, the invention primarily concerns itself with the provision of a slot in one member adapted to receive a projecting tongue of another member, this being associated with the provision of the detents and apertures for releasably receiving the same.

It will be also apparent that the utility of the invention is not restricted to the particular structure shown, and to exemplify the universal utility of the invention, attention is directed to the accompanying Figures 6, 7 and 8 which illustrate a modified structural assembly designated generally by the reference character 40.

In this structural assembly, the members 41 are provided with a series of slots 42 adapted to receive the tongues 43 associated with the members 44.

The members 41 are also formed with a series of apertures 45, these being adapted to releasably receive the detents 46 provided on the tongues 43. It will be also noted that the members 44 are equipped with suitable flanges 47 for supportably engaging the members 41, as will be clearly understood. The members 44 are, of course, equipped with further slots 48 which cooperate with the slots 42, as has already been explained in connection with the structural assembly 15.

The members 44 are, in turn, provided with further slots 49 and with further apertures 50, the former receiving the tongues 51 associated with the member 52. The tongues 51 are provided with the detents 53 releasably receivable in the apertures 50, and the members 52 are also equipped with the flanges 54 supportably engageable with the members 44.

It will be apparent from the accompanying drawings that the various tongues are selectively engageable with the various slots and the various detents are selectively receivable in the various apertures, whereby the structural combination of the assembly may be varied to suit the particular requirement of the purpose for which the assembly is intended.

As another example of the universal utility of the invention, attention is directed to the accompanying Figures 9, 10 and 11 which illustrate the structural assembly designated generally by the reference character 50. This assembly simply assumes the form of a simple frame composed of the side members 51 and 52, the former being provided at the ends thereof with a pair of flanges 53 and also being equipped with a pair of slots and with a pair of apertures 54 and 55 respectively.

The members 52 are, in turn, equipped with a pair of further slots 56, with a further pair of flanges 57 and with a pair of tongues 58 provided with the detents 59.

The assembly of the structure 50 is similar to that already described in connection with the structures 15 and 40 and accordingly, further description thereof at this point is considered unnecessary. However, it should be again emphasized that the structural utility of the invention is not restricted to the assemblies illustrated, but by simply employing members of various sizes and shapes, equipped with locked joints constructed in accordance with the principles of this invention, it will be found that the utility of the invention may be effectively extended to the construction of various cabinets, boxes, shelves, display cases, and similar articles.

While in the foregoing there have been shown certain structural embodiments exemplifying the principles of the invention it is to be understood that minor changes in the construction of the locked joints may be resorted to and that various modified formations of the assembled structure may be produced without departing from the spirit and scope of the invention as claimed.

What I claim as my invention is:

A discerptible structure comprising first and second members, a transverse flange provided on said first member, a longitudinal projection on said first member adjacent said flange, a tongue on said projection parallel to said flange, said projection having an open ended slot therein, said second member having a transversely extending slot therein intersecting one edge thereof, said flange and said tongue receiving said second member therebetween, said slot in said second member receiving said projection of said first member, said slot in said projection receiving that portion of said second member which is axially aligned with said slot in said second member, said second member having a transversely extending portion adjacent said slot and said transversely extending portion abutting one side of said first member.

HAROLD E. NASH.

REFERENCES CITED

The following references are of record in the file of this patent:

UNITED STATES PATENTS

| Number | Name | Date |
|---|---|---|
| 391,752 | Kinnear | Oct. 23, 1888 |
| 813,944 | Bubar | Feb. 27, 1906 |
| 1,483,453 | Knoderer | Feb. 12, 1924 |
| 1,728,964 | Gross | Sept. 24, 1929 |
| 1,860,833 | Clayton | May 31, 1932 |
| 2,112,247 | McLoughlin | Mar. 29, 1938 |
| 2,307,126 | Green et al. | Jan. 5, 1943 |